United States Patent [19]

Iida et al.

[11] Patent Number: 4,862,280
[45] Date of Patent: Aug. 29, 1989

[54] DUAL FILM AND VIDEO TAPE CAMERA

[75] Inventors: Toshiharu Iida; Koji Shimanuki; Kimiaki Nakada; Akira Masuda, all of Tokyo, Japan

[73] Assignees: Fuji Photo Film Co., Ltd.; Sony Corporation, both of Tokyo, Japan

[21] Appl. No.: 176,451

[22] Filed: Apr. 1, 1988

[30] Foreign Application Priority Data

| Apr. 18, 1987 | [JP] | Japan | 62-94306 |
| Apr. 18, 1987 | [JP] | Japan | 62-94307 |
| Apr. 20, 1987 | [JP] | Japan | 62-95039 |

[51] Int. Cl.$^4$ .............................................. H04N 3/14
[52] U.S. Cl. ........................................ 358/229; 358/906
[58] Field of Search ................ 358/229, 209, 225, 76, 358/909, 906; 354/75, 76

[56] References Cited

U.S. PATENT DOCUMENTS

| 3,891,795 | 6/1975 | Johnson et al. | 358/225 |
| 4,714,962 | 12/1987 | Levine | 358/209 |
| 4,716,470 | 12/1987 | Levine | 358/229 |

Primary Examiner—Jin F. Ng
Assistant Examiner—Stephen Brinich
Attorney, Agent, or Firm—Birch, Stewart, Kolasch & Birch

[57] ABSTRACT

A camera for shooting a movie picture and a still picture has a casing in which a pair of imaging optical systems for shooting a still picture and a movie picture, respectively are opened in a front surface of the casing. A functional section for shooting a still picture is disposed in the proximity of the imaging optical system for shooting a still picture, circuits and mechanisms necessary to shoot a movie picture are located in the rear side of the imaging optical system for shooting a movie picture, and a video tape recording mechanism and circuits related thereto are arranged at the back of the functional section for shooting a still picture. Consequently, a movie picture and a still picture can be shot at the same time. Since a film can be loaded in and removed from the camera through the upper surface of the casing, a statisfactory operability is attained. Furthermore, the casing is provided with a cap covering the upper surface of the casing and hence the casing has an improved strength and effectively prevents water and dust.

7 Claims, 11 Drawing Sheets

DUAL FILM AND VIDEO TAPE CAMERA

BACKGROUND OF THE INVENTION

1. Field of the Invention

The present invention relates to a camera for shooting a movie picture and, a still picture, and in particular, to a camera having a function of a still camera using, for example, a silver-halide type of photographic film and a function of a video camera utilizing a video tape.

2. Description of the Prior Art

There has been a requirement for a television camera with a video tape recording function to record a particular scene in the form of a still picture during a shooting operation of a video camera. Conventionally, a still camera using a silver-halide film and a separate video camera using a video tape are carried about in such a case where when a scene suitable for a still picture appears during a shooting of the video camera, the operation of the video camera is interrupted to take the still picture by use of the still camera. In this situation, two units have to be used and in the shooting of the still camera, the operation of the video camera is required to be interrupted, which leads to a disadvantage that an important shooting chance may be lost.

To solve the problems above, there is desired a camera for shooting a movie picture and a still picture configured in a single unit including a combination of a still camera and a video camera such that a still picture can be taken through an operation of the still camera without interrupting the shooting operation of the video camera. In such a camera, the functions associated with the still and movie pictures are required to be achieved at the same time. Consequently, a satisfactory operability is necessary, namely, so-called auto-focus and auto-iris operations must be effected.

Such a camera, with consideration to portability thereof, is desired to be configured such that when a unit shooting a still picture and a unit to take a video picture are combined, the overall contour thereof is smooth in the surfaces thereof as compared with an ordinary camera and that operating or handling means of the still camera unit and the video camera unit can be appropriately and readily manipulated by two hands or by a single hand.

Furthermore, the video camera unit includes a portion to install therein a video cassette which must be provided with an opening through which a video cassette is loaded or removed. However, in a shooting operation with the camera held by both hands, there may results deformation in the portion in which the video cassette is installed through an operation to grasp the portion, thereby deteriorating the stability in holding the camera. As a consequence, the strength and stability of the camera are also required to be taken into consideration.

Furthermore, when the camera is used outdoors, it is necessary to protect such portions exposed in the surface of the casing, for example, as the portion to install a video cassette and a portion to change a film in the still camera unit from dust and rain drops in a rainy day.

Moreover, when recording a movie picture, in cases, for example, where a portion of a video cassette tape not used in previous use is employed for the recording operation and where the recording operation takes a long period of time, a spare cassette is to be prepared. However, since the camera itself is not, in general, provided with a location to mount the spare cassette, a separate cassette case is required. As a result, in cases where the remaining tape volume becomes insufficient and where the tape is entirely used up, the operation to change the cassette takes a long period of time, which leads to a problem that a recording chance may be lost; furthermore, since the user makes haste for the film change, there may occur a case where a tape cassette already recorded is mistakenly installed.

SUMMARY OF THE INVENTION

It is therefore an object of the present invention to provide a camera for shooting a movie picture and a still picture which has the satisfactory portability, operability, and strength, thereby solving the problems of the prior art technology.

According to the present invention, there is provided a camera for shooting a movie picture and a still picture comprising a casing having generally a substantially rectangular parallelepiped shape, a first imaging optical system for a still image and a second imaging optical system for shooting a video picture each disposed at a location in front of the casing so as to being directed to an object scene, a still camera unit arranged in the casing for shooting the object scene so as to record a still picture thereof on a film, and a video camera unit disposed in the casing for shooting the object scene so as to record a movie picture thereof on a video tape, the casing being disposed with a cap covering an upper surface thereof.

Incidentally, the term "a camera for shooting a movie picture and a still picture" in this specification is to be broadly interpreted as an imaging apparatus having both a function of a still camera and a function of a video camera regardless of whether or not the still camera unit and the video camera unit are incorporated into a housing, whether or not the still and video camera units are respectively contained in independent cabinets, whether or not the still and video camera units are separable when both of the units are respectively contained in independent cabinets, and whether or not the still and video camera units can be independently used when both units are separable.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of embodiments of a camera according to the present invention.

Figure 1:
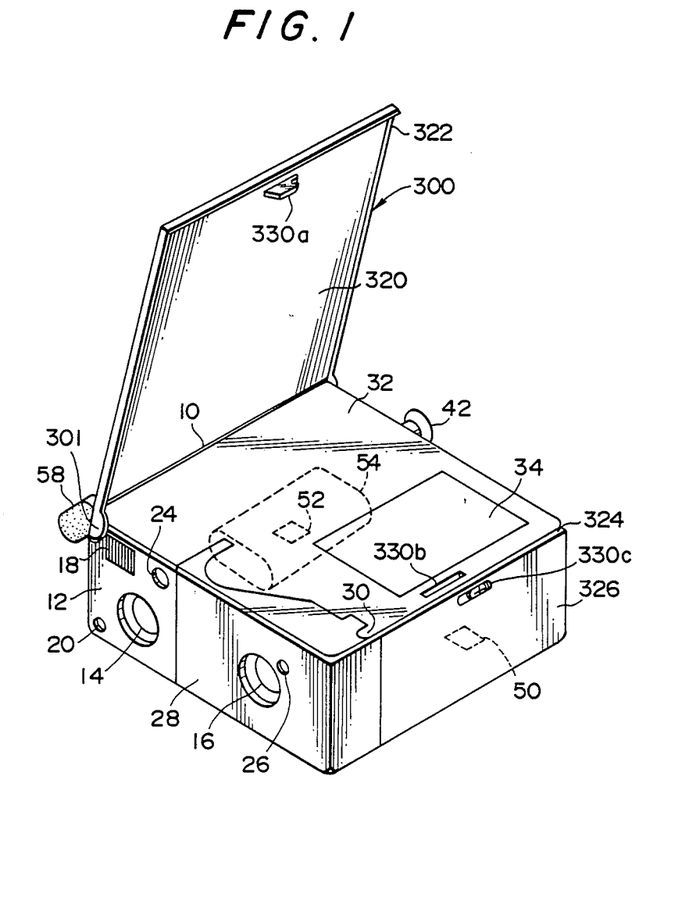
FIG. 1 is a perspective view of an appearance of an embodiment of a camera in which the present invention is applied to a so-called 8-millimeter (mm) video camera.

FIG. 1 shows an embodiment in which the present invention is applied to a camera integrated with a so-called 8-millimeter (mm) video camera. Basically, the camera includes a casing 10 having generally a shape of a substantially rectangular parallelepiped, and the casing contains a unit having a function of a video camera and a unit having a function of a still camera. In an upper-end portion of a side surface of the casing 10, there is disposed a cap 300 entirely covering an upper surface of the casing 10. The video camera unit uses as a video recording medium a video tape 100, FIG. 4B, having a tape width of 8 millimeters (mm) so as to function as a movie video camera unit which shoots an object scene so as to record a movie picture thereof in the form of a video signal on the video tape 100 together with a sound. The still camera unit in the embodiment is a still camera unit of the 135 type using a 35 mm silver-halide type of photographic film 102 as an image recording medium and functions as a still camera unit which records a still picture of an object scene in the form of a latent image on the silver-halide photographic film 102.

The casing 10 has a front surface 12 with a substantially rectangular shape in which two imaging lenses 14 and 16 are disposed. The one imaging lens 14 constitutes an imaging optical system of the video camera unit, whereas the other imaging lens 16 configures an imaging optical system of the still camera unit. In the proximity of the imaging lens 14 of the video camera unit, there are arranged, as shown in the figures, a strobe light emitting device 18, a light emitting device 20 for an automatic distance measurement or for an auto focusing (AF), and an objective lens 24 of an optical viewer 22, FIG. 3. The optical viewer 22 has an eye cup 42 where an eye is to be aligned is located in a rear surface of the casing 10. These two imaging lenses 14 and 16 are disposed to face the same object scene and this is also the case of the objective lens 24 of the optical viewer 22, which enables the still camera unit and the video camera unit in this system to shoot the same object scene. It is to be understood that an electronic view finder may be used in place of the optical viewer.

On a side of the casing 10, namely, on the left-hand side of this embodiment in FIG. 1, there is disposed a microphone 58 to catch a voice and a sound from the object field. A microphone having a directivity associated with a single direction is advantageously employed for the microphone 58.

In the vicinity of the imaging lens 16 of the still camera unit, there is arranged a light receiving sensor 26 for an automatic distance measurement as shown in the figures. In the casing 10, a portion 28 thereof including the front surface 12, as can be seen from FIG. 2, can be opened toward the front direction by a slight angle about a hinge 3 as a pivotal axis. In the housing 28, there are disposed an imaging optical system of the still camera unit including an imaging lens 16, an iris 104, and an optical shutter 106, FIG. 4A, as well as various mechanisms necessary for the operation to shoot a still picture such as an AF sensor 26, a film feed mechanism 108, and a portion of a focusing mechanism 112, FIG. 4A. These elements enable an object image thus shot to be recorded on a film 102.

Figure 2:
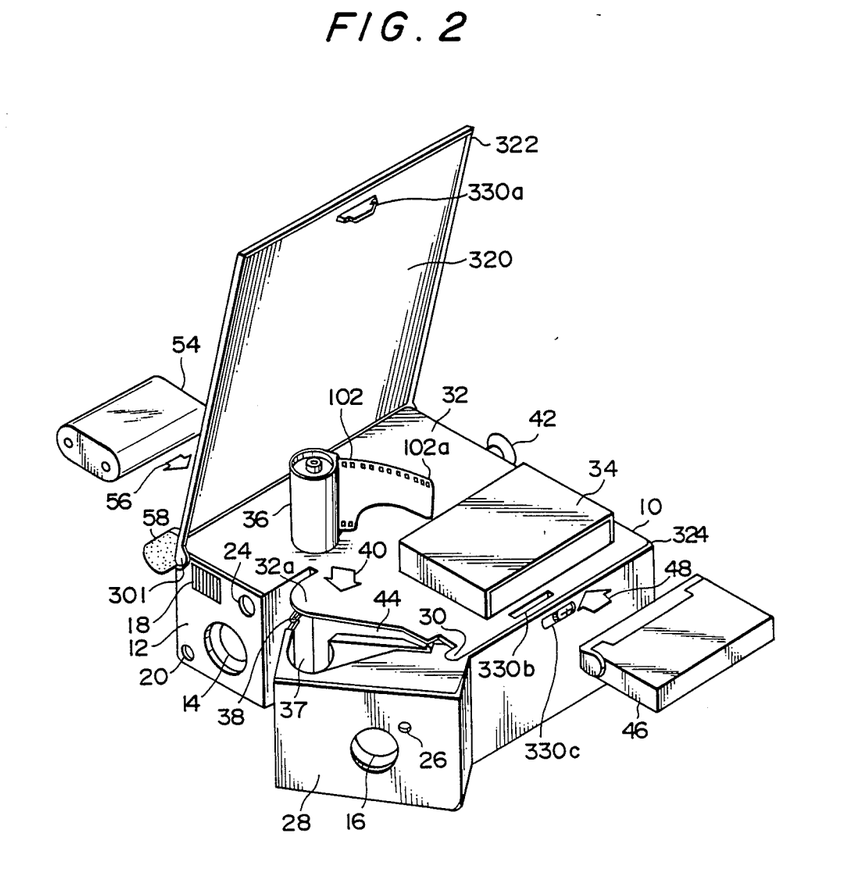
FIG. 2 is a perspective view of a utilization state of the embodiment of FIG. 1.

As can be seen from FIG. 2, the housing 28 is rotated toward the front side by an angle restricted by the movable arm 38, which forms an opening for a drop-in loading of a film 102. Namely, with the housing 28 opened up to this position, the film 102 can be installed in the location where the film 102 is to be mounted through a drop-in loading.

The drop-in loading is described for example in the Japanese Patent Laid-Open No. 68731/1983. According to the camera of the present invention, in a state where the housing 28 is drawn to a front position, as indicated by an arrow 40, a film cartridge 36 is installed downward in a cartridge chamber 37, and at the same time, a leader 102a of the film 102 of the 135 type drawn from the film cartridge 36 by a slight length is inserted downward into a gap 44 formed between a projection 32a in an upper surface 32 of the casing 10 and the housing 28; thereafter, the housing 28 is restored to a closed position so as to easily complete the drop-in loading of the film.

On the upper surface 32 having a generally rectangular shape of the casing 10, there is disposed an open section as a cassette loading section 34. For the cassette loading section 34, when the operator depresses a switch button located in an operation display section 114, FIG. 4B, to mount/detach an 8 mm video tape cassette 46, namely, an eject button to indicate an automatic loading operation of the cassette 46, the cassette loading section 34 is driven by a motor and moves upward/downward so as to form an opening to load the cassette 46. As shown in FIG. 2, when the cassette loading section 34 moves upward, the 8 mm video tape cassette 46 can be installed in or removed from the loader section 34. The cassette 46 is inserted in a direction denoted by an arrow 48 and then the cassette loader 34 is moved downward to the original position, thereby detachably mounting the cassette 46 therein.

Furthermore, on the bottom surface of the casing 10, there are arranged a shutter release button 50 of the still camera unit and a record button 52 of the video camera unit as shown in the figure. These buttons are separately arranged at a left position and a right position in the bottom surface of the casing 10. The user holds the apparatus by fingers of both hands on the upper surface 32 and the bottom surface of the casing 10, and in this situation, the record button 52 or the shutter release button 50 can be pushed by the thumb of the right hand or by the thumb of the left hand, respectively.

The casing 10 is provided with a cap 300 entirely covering an upper surface of the casing 10. Since the cassette 46 is inserted in the loader section 34 as shown in the figure, the cap 300 is rotatably disposed, with a hinge 301 as a pivotal axis, in an upper position on a side surface of the casing 10 opposing the opening section of the loader section 34, which enables the cassette 46 to be easily installed in and removed from the loader section 34.

When the cassette 46 is to be installed in or removed from the cassette loading section 34, the operator may partially open the cap 300 to a position necessary only for the handling of the cassette 46, namely, the cap 300 need not be completely opened.

As a result of the provision of the cap 300, the casing 100 forms substantially a double cap structure in the projection 32 of the upper surface 32 of the casing 10 functioning as a cap in the film loader section associated with a film 102 of the still camera unit together with the loader section 34 of the cassette 46.

In the periphery of a bottom surface 320 of the cap 300, there is disposed a frame wall 322, whereas a step portion 324 is formed in the periphery of the upper surface of the casing 10. When the frame wall 322 engages with the step portion 324, the cap 300 is closed. Furthermore, on the bottom surface 320 and on the upper surface 32 of the casing 10, there are respectively disposed a link member 330a and a link hole 330b cooperatively achieving a lock function to fixedly secure the cap 300 when the cap 300 is closed, namely, when the link member 330a and the link hole 330b are linked with each other, the cap 300 can be fixed. The lock mechanism is released by use of a lock release member 330c disposed on a side surface 326 of the casing 10.

In FIG. 1, at a position of the casing 10 indicated by a dotted line 54, there is detachably installed a power source, for example, a secondary battery of this apparatus. When a cover of a battery mount section located in a side wall of the casing 10 is opened, the battery can be mounted therein from a direction denoted by an arrow 56 of FIG. 2.

Figure 4:
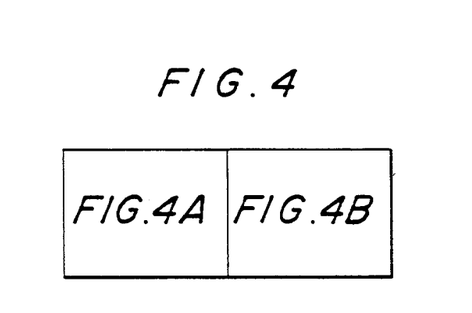
FIGS. 4A–4B, when combined as shown in FIG. 4, are functional block diagrams schematically illustrating internal configuration examples of the embodiment of FIG. 1.
Figure 4A:
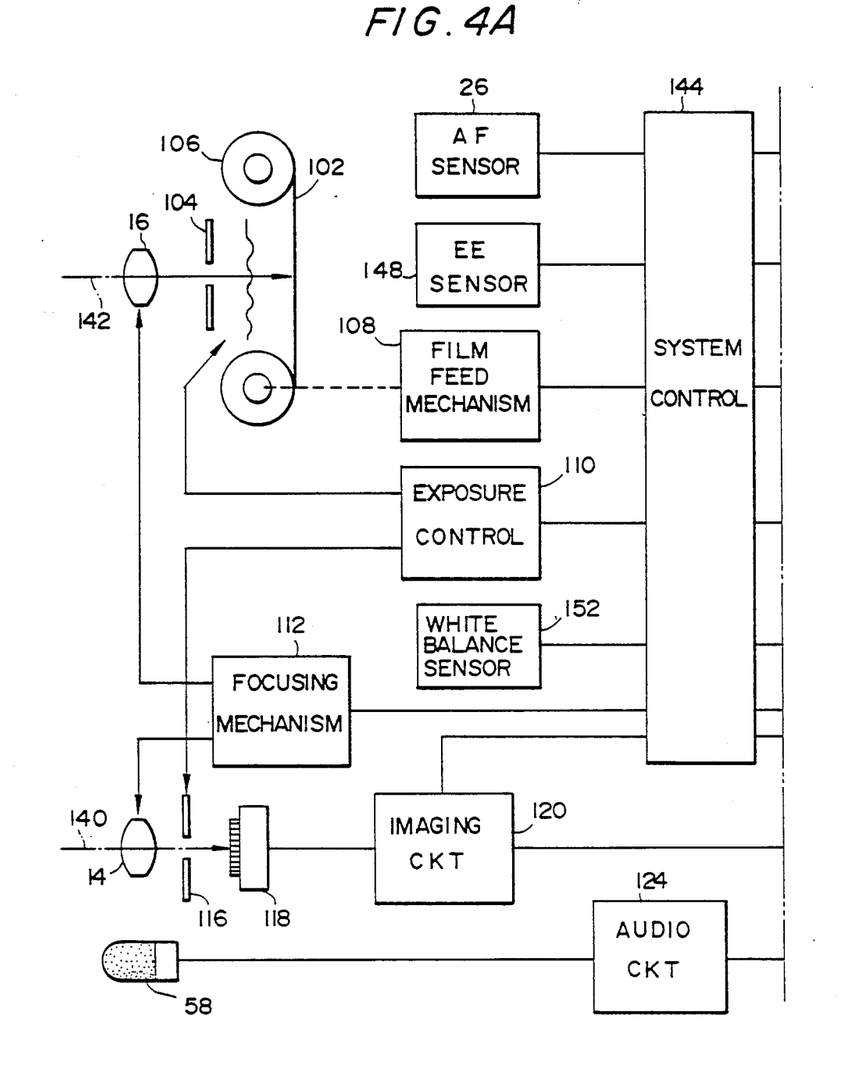
Figure 4B:
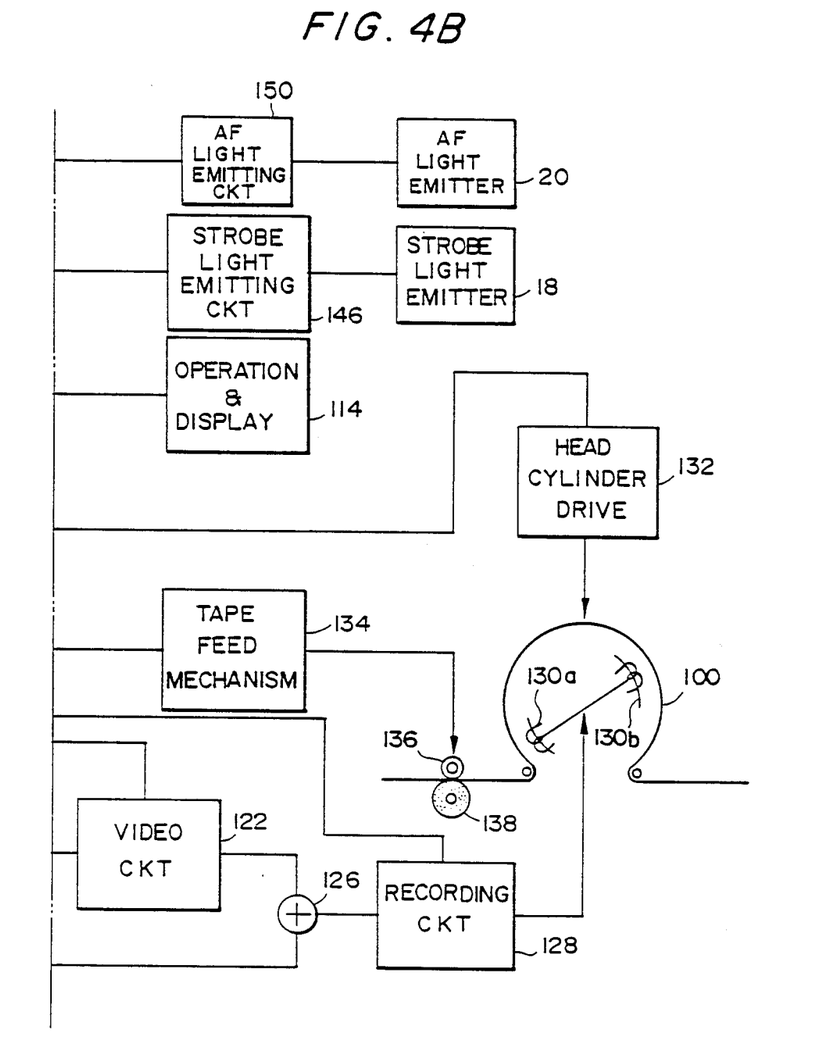

Referring now to FIGS. 4A-4B, there is shown an example of a circuit constitution of the camera of FIG. 1. The imaging optical system of the video unit includes an imaging lens 14 and a solid-state imaging device 118 such as a charge-coupled device (CCD) transducing an optical image of an object obtained through an iris 116 and an imaging lens 14 from an optical signal into a video signal, these elements being located in a light path 140 of the incident light from the object.

Although the imaging lens 14 may be of a fixed-focus type, the focus position of this embodiment is controlled by an automatic focusing (AF) mechanism 112 in response to a distance measurement signal supplied from a system control circuit 144. For the iris 116, an automatic exposure adjust (EE) function is advantageously employed, namely, an appropriate exposure is attained by means of an exposure adjust circuit 110 in response to a distance measurement signal received from the system control circuit 144. The imaging device 118 is driven by an imaging circuit 120, and a video signal generated from the imaging device 118 is supplied via the imaging circuit 120 to a video circuit 122.

The imaging circuit 120 clocks the imaging device 118, a video signal outputted therefrom is amplified, and the resultant signal undergoes necessary corrections such as an adjustment of a white balance, thereby generating a composite video signal in the standard color television format including a luminance signal, a color difference signal, and a synchronizing signal. The obtained composite video signal is delivered to the video circuit 122 so as to undergo various processing such as a preemphasis emphasizing a high-frequency component, a clamping to attain a predetermined signal level, and a frequency modulation transforming the signal into a recording signal suitable for recording on a video tape 100, thereby supplying a resultant signal to a mixer 126.

On the other hand, a sound caught by the microphone 58 is converted by the audio circuit 124 into an audio signal, which is further subjected to processing such as an amplification, an automatic gain adjustment, a frequency modulation transforming an obtained signal into a recording signal suitable for the recording thereof on the video tape 100, thereby supplying a resultant signal to the mixer 126.

Figure 3:
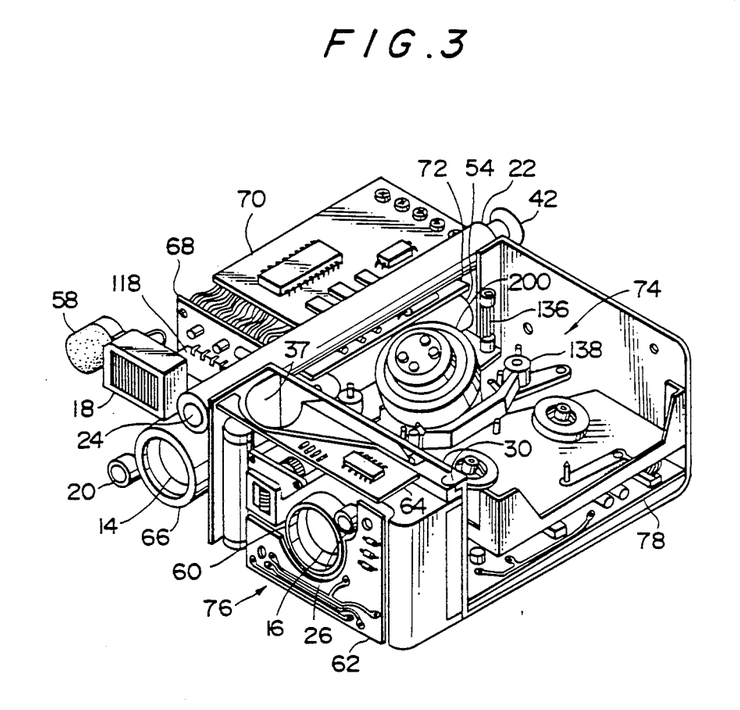
FIG. 3 is a perspective view schematically showing an internal structure of the embodiment of FIG. 1.

The recording signals associated with the composite video signal and the audio signal are mixed in the mixer 126 and is then amplified in a recording circuit 128 so as to be fed to a set of magnetic heads 130a–130b, which are secured on a head cylinder 200, FIG. 3, to have the different azimuth angles and are rotated at a predetermined constant rotary speed by a head cylinder drive mechanism 132. The video tape 100 is held between a capstan 136 driven by the tape feed circuit 134 and a pinch roller 138 so as to be fed in a predetermined direction. Through these operations, the composite video signal and the audio signal supplied to the magnetic heads 130a–130b are recorded on the video tape 100.

The optical system of the still camera unit includes an imaging lens 16 followed by an iris 104, an optical shutter 106, and a film 102, those components being arranged in a light path 142 of the incident light from the object. Although the imaging lens 16 may be of a fixed-focus type, the focus position of this apparatus is designed to be controlled by means of the focusing mechanism 112. For the iris 104 and the optical shutter 106, there is advantageously employed an automatic exposure adjust function by use of the exposure control circuit 110.

The film 102 is automatically loaded, wound on, and wound back by means of the film feed mechanism 108 in response to an instruction signal supplied from the system control circuit 144.

The system control circuit 144 controls various sections of this apparatus, for example, effects a control on the tape feed circuit 134 in response to an operation of the record button 52 in the operation and display section 114, thereby controlling an operation to feed the video tape 100. Furthermore, for example, the system control circuit 144 controls the exposure control circuit 110, the focusing mechanism 112, and the strobe light emitting circuit 146 in response to an operation of the shutter release button 50.

The apparatus of this embodiment is provided with an automatic exposure (EE) sensor 148, which measures the brightness of the object scene so as to supply the system control circuit 144 with data indicating the measured value of the brightness. The system control circuit 144 controls the exposure control circuit 110 and the strobe light emitting circuit 146 depending on the brightness data of the object scene supplied from the EE sensor 148. In response thereto, the exposure control circuit 110 adjusts the opening of the iris 104 of the still camera unit and at the same time controls the exposure period of time for which the shutter 106 is to be kept opened. Furthermore, the strobe light emitting circuit 146 controls the period of time of the light emission effected by the stroboscopic light emitter 18.

The auto focusing (AF) light emitting element 20 is connected via the AF light emitting circuit 150 to the system control circuit 144. In response to an instruction from the system control circuit 144, the AF light emitting circuit 150 drives the AF light emitter element 20 to radiate, for example, an infrared light to an object; and then a portion of the infrared radiation reflected from the object is sensed by the AF sensor 26 so as to accomplish an automatic measurement of the distance between the apparatus and the object. The measured data of the distance is delivered from the AF sensor 26 to the system control circuit 144.

The distance is measured according to the principle of the trigonometrical survey; in the apparatus, however, as can be seen from FIG. 1, since the distance or the base line between the AF light emitting element 20 and the AF sensor 26 is sufficiently long, an appropriate distance measurement can be accomplished. Depending on data of the distance between the apparatus and the object supplied from the AF sensor 26, the system control circuit 144 controls the focusing mechanism 112 to adjust the foci of the two imaging lenses 14 and 16, respectively.

Furthermore, this apparatus is provided with a white balance sensor 152, which is sensitive to color components of an incident light from the object so as to deliver data of the color components to the system control circuit 144. Based on the data, the system control circuit 144 sets parameters to a white balance adjust circuit in the imaging circuit 120.

The operation and display section 114 is a functional unit which supplies this apparatus with an instruction manually entered and which visibly or audibly indicates a state of the apparatus to the operator. The operator's console 114 therefore comprises various operation buttons such as a shutter release button 50, a record button 52, a button to switch between an automatic operation and a manual operation for the adjustment of the focus, the exposure, and the white balance; buttons to set a fader, a wiper, and a title insertion; operation buttons to set the recording, rewinding, and review operations of a video tape recording mechanism 74, FIG. 3; a strobe setting button of the still camera unit, and indicators such as for the operation mode display, the tape counter, the tape end alarm, the film counter, and the power level warning indicator.

Referring now to FIG. 3, there is schematically shown an internal configuration of the apparatus with the casing 10 removed in the state of FIG. 1. The housing 28 of the casing 10 primarily includes therein a still camera unit 76. For example, there are arranged, as shown in the figure, a lens unit 60 in which an imaging optical system including an imaging lens 16 of the still camera unit 76 and the AF sensor 26 are incorporated, and electronic circuit boards 62 and 64 on which such components associated with functions to shoot a still picture as an exposure control circuit 110, a focusing mechanism 112, an automatic light measurement and distance measurement circuit, an AF light emitting circuit 150, and a stroboscopic light emitter circuit 146 are mounted.

Following an imaging optical system unit 66 including the imaging lens 14 of the video camera unit, there is disposed, as shown in the figure, a solid-state imaging device 118 mounted on the electronic circuit board 68; furthermore, components associated with functions to shoot a movie picture are also mounted thereof such as an exposure control circuit 110, a focusing mechanism 112, and an automatic light measurement and distance measurement circuit. On the rear side thereof, there are arranged electronic circuit boards 70 and 72 including a video circuit 120 and an audio circuit 124, and a battery 54 is disposed therebelow.

As shown in FIG. 3, a video tape recording mechanism 74 comprising a video tape cassette loading section 34, a magnetic head cylinder 200, a capstan 136, and a pinch roller 138 is disposed on a back side of the still camera unit 76, and below the video tape recording mechanism 74, there are arranged a head cylinder drive mechanism 132 including a cylinder motor and the like and an electronic circuit board 78 mounting thereon mixer 126, recording circuit 128, tape feed circuit 134, and system control circuit 144. An optical view finder 22 is, as shown in this diagram, located between the electronic circuit board 70 and the video tape recording mechanism 74.

According to the embodiment of the present invention, as described above, the imaging lenses 14 and 16 are disposed in the front surface 12 of the casing 10 and the still camera unit 76 is located in the proximity of the imaging lens 16 of the still camera unit; whereas circuits and mechanisms necessary to shoot a movie picture are arranged on the rear side of the imaging lens 14 of the video camera unit, and the video tape recording mechanism and circuits associated therewith are disposed on the back side of the still camera unit 76. Installation and removal of the video cassette as well as the drop-in loading of the film 102 can be accomplished through the upper surface 32 of the casing 10. Consequently, the apparatus is formed in a compact contour and the operation to shoot a movie picture by the video camera unit and the operation to take a still picture by the still camera unit can be simultaneously effected without causing any interferences therebetween.

Furthermore, since the casing 10 is provided with the cap 300 entirely covering the upper surface thereof and there is configured a substantially double-cover structure, there are obtained an effect preventing water and dusts from entering the apparatus. Consequently, when using this camera outdoors, portions thereof exposed in the surface of the casing 10 such as the video cassette loading section of the video camera unit and the film changing section of the still camera unit can be protected from dusts and rain drops in a rainy day. Moreover, for the strength and the operability, if the cap 30 is not disposed, in an operation to shoot a scene by holding the camera in both hands, the video cassette loading section is grasped and is deformed as a result, which may deteriorate the stability. According to the camera of the embodiment, the cap 300 is grasped in the shooting operation, which facilitates the operation to hold the camera and hence the operability and the strength are increased.

FIGS. 5–8 show an alternative embodiment of a camera according to the present invention. In this embodiment, as shown in the figures, at a central portion of the cap 300, there is disposed an optical view finder 22 in a direction from the rear side to the front side.

The optical finder 22 includes an objective lens 24 directed to an object field to which two imaging lenses 14 and 16 are directed. The optical finder 22 further comprises an eyecup 42 on which an eye of the operator is to be aligned and which is located at a rear end of the cap 300. The optical view finder 22 enables the operator to visually confirm an object field to be shot by the still camera unit and the video camera unit of this apparatus.

Since the internal constitution of this camera are the same as those of FIGS. 4A and 4B showing the internal configuration of the apparatus of FIGS. 1–2, further description thereof will be omitted.

Figure 8:
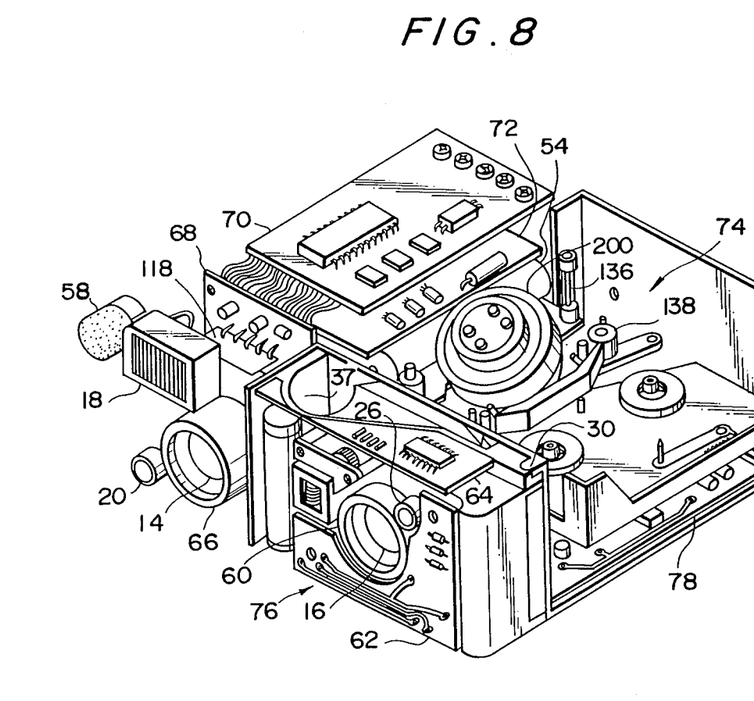
FIG. 8 is a perspective view showing an internal structure of the embodiment of FIG. 5.

Furthermore, FIG. 8 schematically shows the internal structure in which the casing 10 is removed from the apparatus. As can be seen from FIG. 8, in this camera, the optical view finder 22 is disposed on the cap 300, namely, the configuration is different from that of FIG. 3 in which the optical view finder 22 is located in the casing 10.

Since the other configuration of this apparatus is the same as that of the camera of FIGS. 1-2, description thereof will be omitted.

According to the apparatus of FIGS. 5-8, in the central portion of the cap 300, there is fixedly disposed an optical view finder 22 in a direction from the rear side to the front side, and the optical finder 22 increases the strength of the cap 300, which as a result further increases the strength of the apparatus when the cap 300 is closed.

Figure 5:
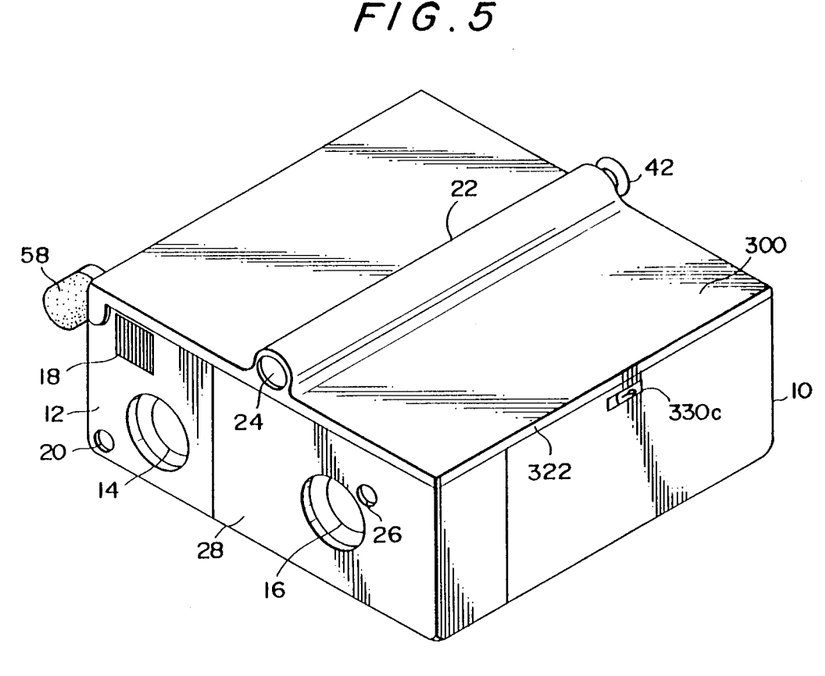
FIG. 5 is an outer perspective view of an alternative embodiment in which the present invention is applied to a so-called 8-mm video camera.
Figure 6:
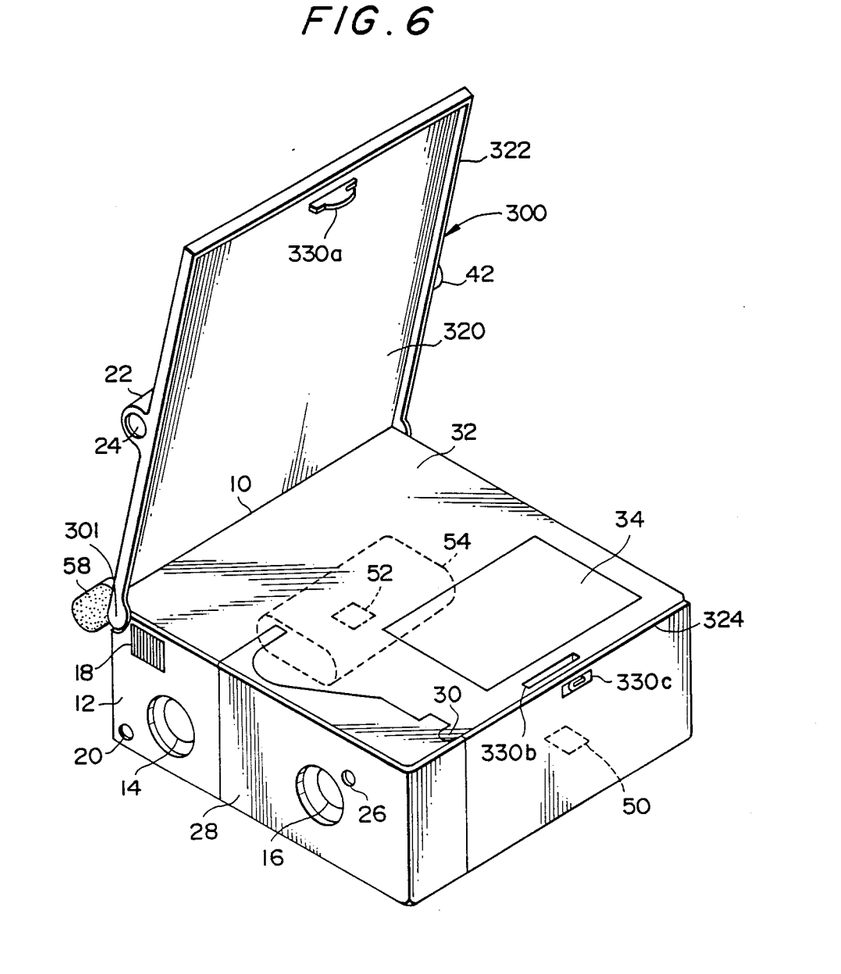
FIGS. 6–7 are outer perspective views useful to explain utilization states of the embodiment of FIG. 5.
Figure 7:
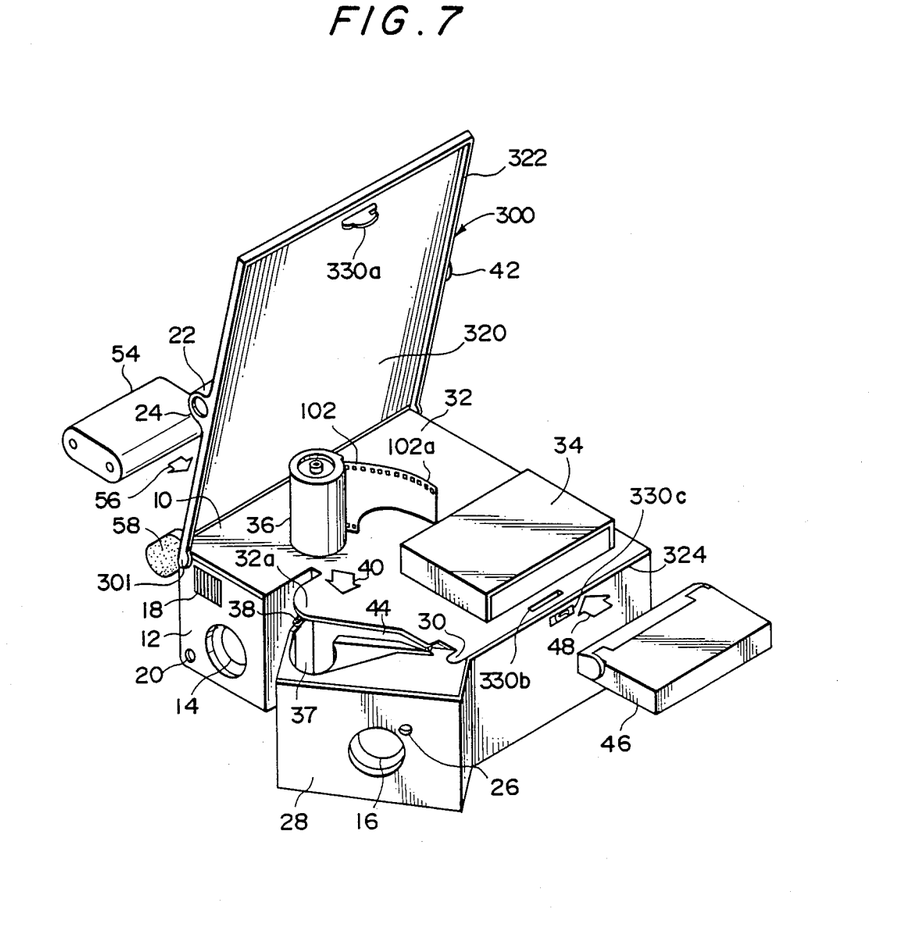

Although the optical finder 22 is located at the central portion of the casing 10 in the direction from the left to the right as shown in FIG. 5, the optical finder 22 may be arranged at a position in the proximity of the left end portion or the right end portion of the casing 10.

Figure 9:
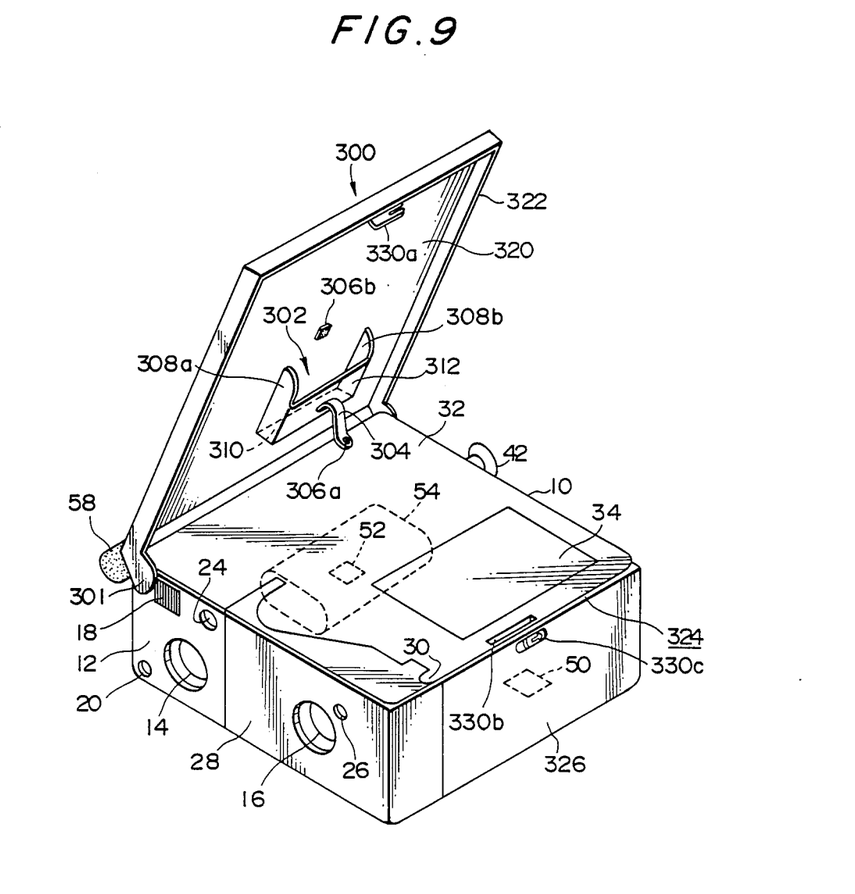
FIG. 9 is a perspective view of an appearance of still another embodiment in which the present invention is applied to a so-called 8-mm video camera.
Figure 10:
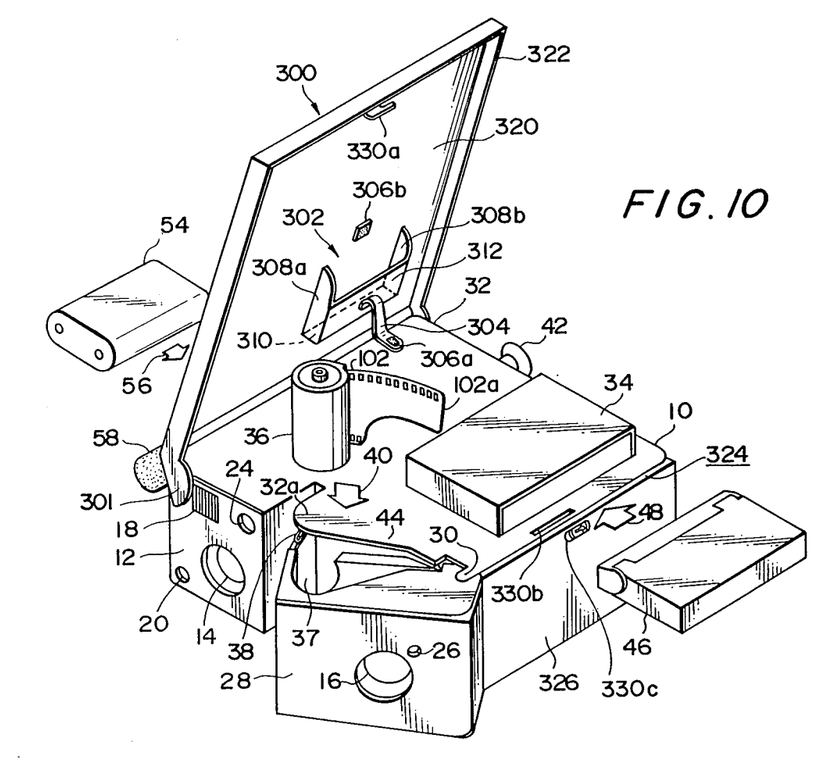
FIG. 10 is an outer perspective view useful to explain a utilization state of the embodiment of FIG. 9.

FIGS. 9-10 show further an alternative embodiment of a camera according to the present invention. In this embodiment, on a rear surface 320 of the cap 300, there is disposed a cassette holding section 302 in which a spare cassette is to be held. The cassette holder 302 is formed with side walls 308a-308b fixedly established on the rear surface 320 of the cap 300, a bottom wall 310 secured on the rear surface 320 in a direction orthogonal to the side walls 308a-308b, and a front wall 312 arranged so as to be linked with the side walls 308a-308b and the bottom wall 310. A cassette 46 is inserted in a cassette holding section 302 through respective portions of the side walls 308a-308b and the front wall 312. On the front wall 312 of the cassette holder 302, there is mounted a holding belt 304 in a shape of a band on which a magic tape 306a is fixed. The magic tape 306a can be attached to and detached from a magic tape 306b disposed on the rear surface 320 of the cap 300. When the magic tapes 306a-306b are fixed to each other, the cassette loaded in the cassette holding section 302 is prevented from sliding out therefrom when the body of the camera is inclined, thereby protecting the cassette from destruction.

Since the cassette holding section 302 has an upper portion broadly opened, the cassette can be easily inserted and removed therethrough. In the case of this embodiment, a frame wall 322 preferably possesses a width which is greater than that of each of the side walls 308a-308b of the cassette holder 302.

Since the internal layout and the internal constitution of this camera from which the casing 10 is removed are the same as those of FIGS. 3-4B associated with the apparatus of FIGS. 1-2, further description thereof will be omitted.

According to the apparatus of FIGS. 9-10, on the rear surface 320 of the cap 300, there is arranged a cassette holding section 302 to hold a spare cassette, and hence the user need not prepare a separate holding case or the like to hold a spare cassette. Consequently, in an operation to change a cassette during a recording operation, there is no fear of mistakenly loading a tape already recorded, in other words, the tape change can be smoothly accomplished and hence the user rarely loses a recording chance, which enables a desired picture to be taken.

In this embodiment, although the cassette holding section 302 to hold a spare cassette includes cassette holding members, the holding belt 304 on which the magic tape 306a is fixed, and the magic tape 306b, there may be employed other holding methods in which, for example, the cassette is retained by use of a spring or the like and in which a box structure containing the entire cassette is used.

Incidentally, in the embodiments above, although the microphone 58 is disposed at an external location of the casing 10, when the contour of the cap 300 is formed to cover the microphone 58, the microphone 58 can be protected.

Furthermore, in the embodiments above, when securing the cap 300 in the case where the cap 300 is closed, although a lock mechanism therefor comprises the link members 330a-330b respectively disposed on the rear surface 320 of the cap 300 and the upper surface 32 of the casing 10, the cap 300 may naturally fixed, for example, by use of magnets or the like. Moreover, in a case where a packing agent, a magnet, or the like is mounted on the step portion 324 disposed in the periphery of the upper surface 32 of the casing 10, the cap 300 can be further closely secured and a sealing effect is improved.

In addition, there may be employed a 2-step opening method in which the cap 300 is completely opened and is partially opened to a position only necessary for the 8-mm video tape cassette 46 to be installed in or removed from the cassette loading section 34.

Furthermore, in the embodiments above, although a silver-halide type of photographic film is used in the still camera unit, there may also be employed an instant photography and the electronic still camera recording a video signal on a magnetic disk.

As described above, in the camera according to the present invention, a still picture and a movie picture can be shot at the same time and the operations to install a film and a cassette can be achieved through the upper surface of the casing, a satisfactory operability is attained. Furthermore, the casing is provided with the cap covering the upper surface of the casing, there is obtained an effect to prevent water, dusts, and the like.

As a result, there can be provided a portable camera with a high operability for shooting a movie picture and a still picture which has an increased strength and which prevents water and dust from entering the camera.

When the cap of the apparatus is provided with an optical finder, the strength of the camera can be further increased.

When the cap is provided with a cassette holding section to hold a spare cassette, it is possible to hold a spare cassette.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera for shooting a movie picture and a still picture comprising:
    a casing having generally substantially rectangular parallelepiped shape;
    a first imaging optical system for shooting a still image and a second imaging optical system for shooting a video picture disposed in a front surface of said casing, said first and second imaging optical systems being directed to an object scene;
    a still camera unit disposed in the proximity of said first imaging optical system in said casing for shooting the object scene to record a still picture thereof on a film; and a video camera unit disposed in said casing for shooting the object scene to record a movie picture thereof on a video tape;

said video camera unit including an imaging circuit section disposed on a rear side of said second imaging optical system for shooting the object scene to generate a video signal representing a movie image thereof, and a video tape recording section disposed on a rear side of said still camera unit for recording the video signal on a video tape;

said casing having in the upper surface of the casing a first opening for loading a film in said still camera unit, and a second opening for installing a video tape cassette in said video tape recording section;

said casing further having a cap member to cover said upper surface, said cap being disposed so that the cap can position both in a first position covering the second opening and in a second position enabling the video tape cassette to be installed in and removed from the video tape recording section.

2. A camera in accordance with claim 1, where said cap is provided with an optical view finder directed to the object scene.

3. A camera in accordance with claim 2, wherein said optical view finder is disposed substantially in a central portion of said cap.

4. A camera in accordance with claim 1, wherein said cap includes a cassette holding section for holding said video tape cassette.

5. A camera in accordance with claim 4, wherein said cassette holding section is disposed in a rear surface of said cap.

6. A camera in accordance with claim 1, wherein said casing is provided with a view finder directed to the object scene.

7. A camera in accordance with claim 1, wherein said still camera unit includes a film loading section in which a cartridge containing said film is inserted by drop-in loading in said first opening.

* * * * *